Sept. 30, 1969 M. A. PROVI ETAL 3,469,645
BATHROOM SCALE WITH ELECTRONICALLY OPERATED READOUT INSTRUMENT
Filed Aug. 5, 1968 3 Sheets-Sheet 1
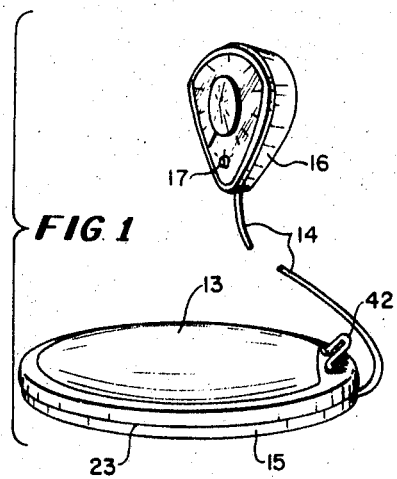
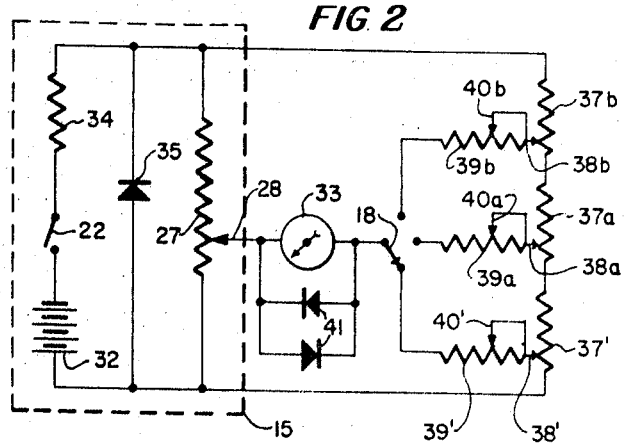
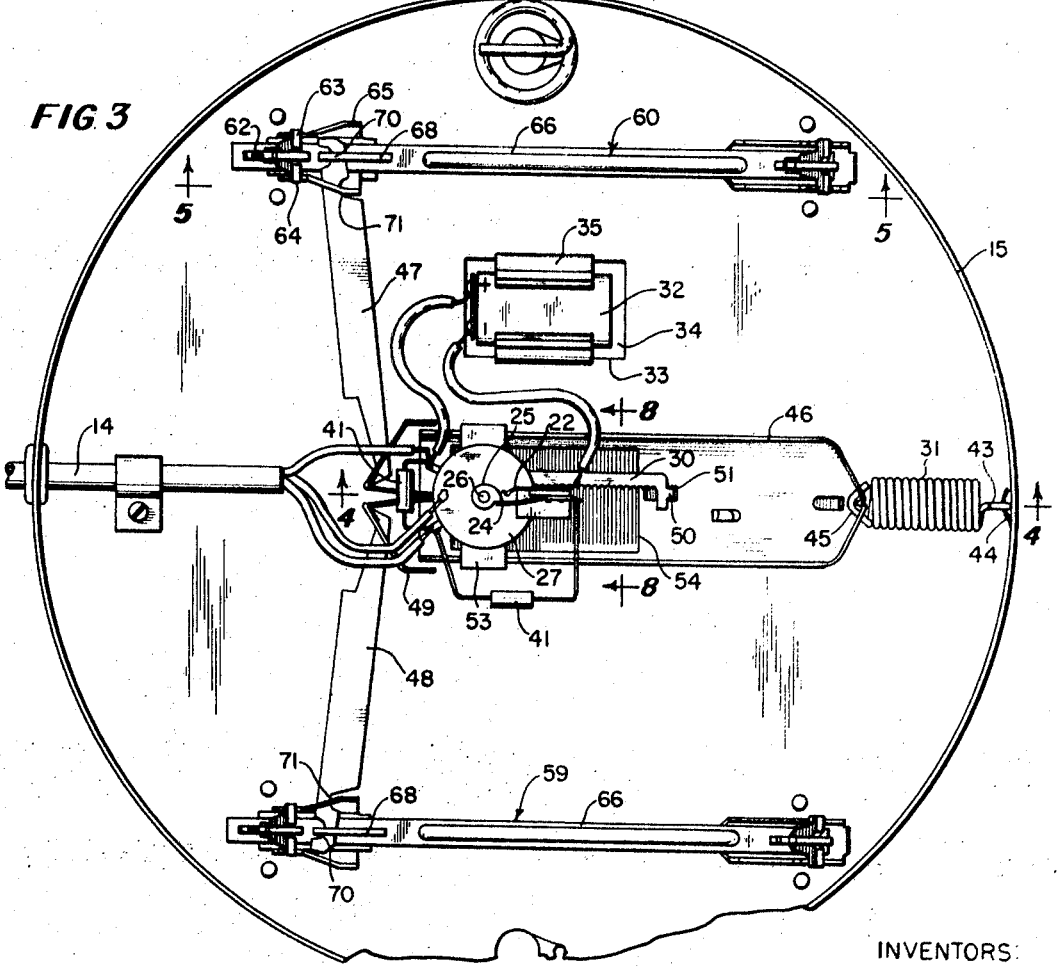
INVENTORS:
MIKE A. PROVI
GEORGE E. STINSON
LAWRENCE V. LANG
Atty.

Sept. 30, 1969  M. A. PROVI ET AL  3,469,645
BATHROOM SCALE WITH ELECTRONICALLY OPERATED READOUT INSTRUMENT
Filed Aug. 5, 1968  3 Sheets-Sheet 2

INVENTORS:
MIKE A. PROVI
GEORGE E. STINSON
LAWRENCE V. LANG

Atty.

Sept. 30, 1969    M. A. PROVI ETAL    3,469,645
BATHROOM SCALE WITH ELECTRONICALLY OPERATED READOUT INSTRUMENT
Filed Aug. 5, 1968    3 Sheets-Sheet 3

INVENTORS:
MIKE A. PROVI
GEORGE E. STINSON
LAWRENCE V. LANG

Atty.

United States Patent Office 3,469,645
Patented Sept. 30, 1969

3,469,645
BATHROOM SCALE WITH ELECTRONICALLY OPERATED READOUT INSTRUMENT
Mike A. Provi, George E. Stinson, and Lawrence V. Lang, Rockford, Ill., assignors to The Brearley Company, Rockford, Ill., a corporation of Illinois
Filed Aug. 5, 1968, Ser. No. 750,108
Int. Cl. G01g 3/14
U.S. Cl. 177—210     20 Claims

ABSTRACT OF THE DISCLOSURE

A switch in the bathroom scale is closed automatically when the platform is depressed in a weighing operation, to complete an electrical circuit for a low voltage battery connected with a potentiometer and a meter that is in more or less remote relationship to the scale and serves as the readout instrument, giving readings directly and accurately in terms of the person's weight as the sweep arm of the potentiometer, mechanically connected indirectly with the scale platform, is moved in direct proportion to the stretching of a weighing spring as the platform is depressed. In one form, each weight range must be first selected by the operator turning a knob on the readout instrument the knob cutting into the circuit a different resistance to offset the potentiometer for each weight range, so that the meter can give the correct weight reading directly.

---

This invention relates to bathroom scales and is more particularly concerned with low voltage electronically operated readout means in more or less remote relationship to the scale proper, as, for example, a wall instrument, or one to be held in one's hand, flexibly connected in either case by means of a flexible electrical cable with the scale.

More specifically stated, the invention utilizes a battery to furnish the low voltage current, a potentiometer the movable contact of which is turned with the pinion operable by the usual rack in its lineal movement in a weighing operation to cut out resistance from an electrical circuit that includes as the readout means a meter in more or less remote relationship to the scale proper, in which the needle indicating potential serves here to indicate instead the weight of the person standing on the scale platform. Contacts are included in the the circuit and opened automatically by a cam that turns with the pinion and potentiometer contact when the scale returns to zero, thereby eliminating any likelihood of current flow such as would sooner or later use up the battery.

In a modified or alternative form, the readout means includes a manually operable control knob rotatable to either on of three positions for a weight range of zero to 100 pounds, 100 pounds to 200 pounds, and 200 pounds to 300 pounds, so that with one meter with resistances of three different values either of which is arranged to be connected in series with it, depending upon the weight range in which the person to be weighed falls, the weight may be accurately indicated by properly setting the control knob for the selected weight range.

The invention is illustrated in the accompanying drawings, in which:

FIG. 1 is a perspective view of a bathroom scale with more or less remote readout means operable by low voltage electronic means in accordance with our invention;

FIG. 2 is an electrical circuit diagram for this scale, in which the components enclosed within dotted lines are in the scale proper and the rest are in the readout means;

FIG. 3 is a plan view of the scale with the platform removed;

Similar reference numerals are applied to corresponding parts throughout these views.

Figure 9:
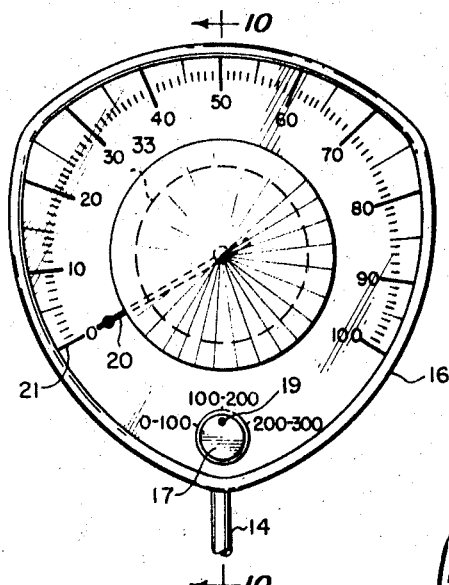
FIG. 9 is a face view of the readout instrument of FIGS. 1 and 2 with its three-position manually operable control knob for the three weight ranges indicated.
Figure 10:
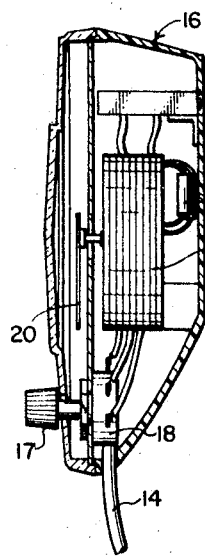
FIG. 10 is a cross-section on the line 10—10 of FIG. 9.

Referring to the drawings, the reference numeral 13 in FIG. 1 designates a bathroom scale made in accordance with our invention having a flexible electrical cable 14 of suitable length extending from the base 15 to the readout instrument 16 illustrated in FIGS. 9 and 10, for which the electrical circuit diagram of FIG. 2 applies. The control knob 17 rotatable on the face of this instrument serves to operate a selector switch 18 to either one of three positions for three different weight ranges of 0 to 100 pounds, 100 pounds to 200 pounds, and 200 pounds to 300 pounds, depending upon what range the weight of the person to be weighed happens to fall in. Thus, for a child or someone whose weight is below 100 pounds, the knob 17 should be set with its indicator dot 19 to the left opposite the designation 0–100, instead of where it is shown in FIG. 9 below the designation 100–200. The person reads his or her weight directly by reference to the position of needle 20 with respect to the graduation 21, whereas a person in the second range 100–200 reads his or her weight as 100 plus whatever the needle 20 indicates, and a person in the third range 200–300 reads his or her weight as 200 plus whatever the needle 20 indicates.

Figure 11:
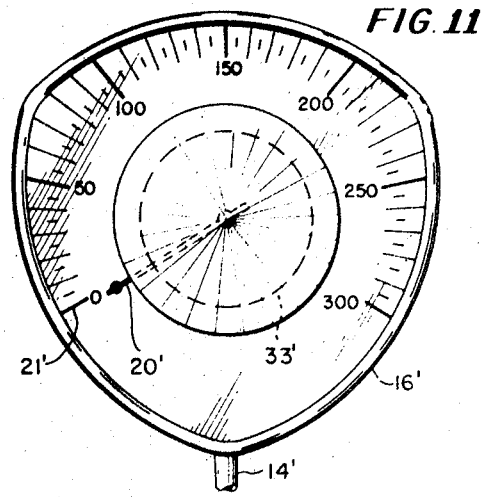
FIG. 11 is a face view of another readout instrument similar to that of FIG. 9 but omitting the control knob, this readout instrument giving a direct reading in the range of zero to 300 pounds.
Figure 12:
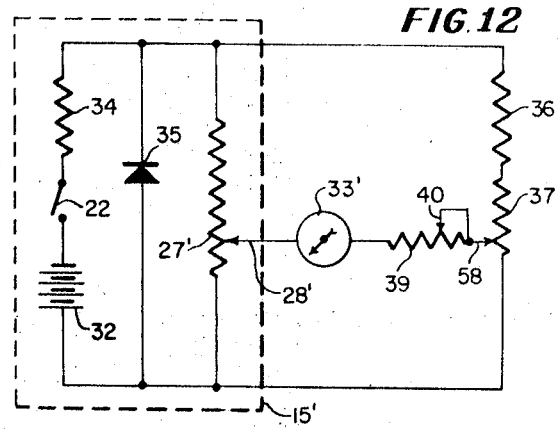
FIG. 12 is a circuit diagram similar to FIG. 2 but concerning FIG. 11.

The other readout instrument 16′ shown in FIG. 11 has a similar flexible electrical cable 14′ extending to it from the base of the scale but the circuit shown in FIG. 12 applies to this instrument, in which the needle 20′ swings with respect to the graduuations 21′ when a person stands on the scale and it indicates the person's weight directly due to the difference in this circuit of FIG. 12 in relation to that of FIG. 2, as will now be pointed out.

In both scales there is a spring blade switch 22, which, in the zero or unloaded position of the platform 23, has its one spring blade contact 24 held open by a cam 25 that turns with the shaft 26 relative to the potentiometer 27 to turn its sweep arm illustrated diagrammatically at 28 in FIGS. 2 and 12 in proportion to the weight imposed on the platform, the shaft 26 being turned in the usual way by means of a pinion 29 fixed to the shaft meshing with a rack 30 movable lineally in the usual way to whatever extent the weighing spring 31 is stretched in the weighing operation. A 9-volt battery 32 supplies the low voltage current and is suitably removable and replaceable through a rectangular opening 33 in the bottom of the base 15, the battery being suitably mounted on a plate 34 by clips 35, although any other suitable or preferred means may be employed, as, for example, that shown in Provi Patent 2,892,010. The meter 33 in FIG. 2 and the meter 33′ in FIG. 12 are both essentially volt meters or galvanometers but instead of indicating voltages across their terminals in different positions of the sweep arm 28 or 28' with respect to the potentiometers 27 and 27', they serve in the readout instruments 16 and 16' to indicate the weight of the person standing on the scale.

Referring to FIG. 12 first, which is the simpler circuit for readout instrument 16', upon closure of switch 22 the 9 volts of battery 32 are applied to the series voltage regulator made up of resistance 34 and diode 35, to maintain a constant voltage of 6 volts across potentiometer 27' and also the series circuit made up of resistances 36 and 37, the voltage remaining constant throughout the normal life of the battery 32 and through any change of current in the balance of the circuit. As most all potentiometers tend to be non-linear in the beginning of travel of the sweep arm, electrical zero is set by starting the travel of arm 28' beyond this point. If the sweep arm 38 of resistance or potentiometer 37 is moved to the same relative position electrically, as the sweep arm 28' of potentiometer 27', then the difference in voltage between these two points will be zero, and no current will flow through meter 33' and its series resistance 39 so that electrical zero is set for the readout instrument 16'. Now, as weight is applied to the scale platform the sweep arm 28' will, of course, shift its position with respect to potentiometer 27' causing the voltage to rise at this point and a corresponding change in current through meter 33' and resistance 39, the weight of the person being then readable on the scale 21' of the readout instrument 16' in accordance with the position of the needle 20'. With a known weight applied to the platform of the scale, near the full capacity, for instance 300 pounds, the resistance 39, which is adjustable, is set so this weight is registered on the meter 33" of the readout instrument 16'. Then, by adjustment of the sweep arm 38 with respect to resistance 37, which is the zero set potentiometer and by adjustment of the sweep arm 40 relative to resistance 39, the high end calibration potentiometer, extremely good accuracy is obtained across the entire range from zero to 300 pounds, due to the self-compensating characteristics of this circuit. As the sweep arm 28' of potentiometer 27' travels upscale to a higher voltage point, the current change with voltage would tend to become non-linear, so this is controlled to almost elimination by the regulating action of resistor 37, which will have a rise in voltage with increased current flow, which in turn will oppose this tendency towards non-linear change. As a result, there is extremely good linearity with travel of the sweep arm 28' and excellent accuracy between the low and high end calibration points. The dotted frame 15' in FIG. 12 indicates the components of the circuit that are to be found in the scale base, the rest being, of course, in the readout instrument 16'.

Turning next to FIG. 2, there again all of the components to be found in the base 15 are enclosed in dotted lines, the rest being the components in the readout instrument 16. The left-hand half of this circuit is the same as in FIG. 12 and corresponding components have been correspondingly numbered except for the numbering of the potentiometer 27 and its sweep arm 28 and also the numbering of the base diagrammatically indicated at 15, inasmuch as this circuit has reference to readout instrument 16. Here again, as switch 22 closes, due to depression of the platform 13, a constant voltage of 6 volts is applied across the potentiometer 27. This voltage is supplied from the 9-volt battery 32 and is regulated and held constant due to regulator action of resistance 34 and voltage regulator diode 35. Any change in battery voltage throughout its normal life, or any difference in current flow in the measuring circuit, will have no effect on this constant 6-volt potential as they are offset by compensating current flow through the regulator diode 35 and resistance 34. As stated before in reference to FIG. 12, as all potentiometers tend to be slightly non-linear at the beginning and the end of the sweep arm 28 relative to the resistance 27, sweep arm 28 is set to begin its travel well past the beginning of the restistance 27. Meter 33, which is basically a volt meter with a scale calibration of zero to 100 and a basic meter movement of zero to 500 micro-amperes, must at this point have zero current flow through it and read absolute zero on its graduation 21. This is accomplished by setting sweep arm 38' on potentiometer 37', the 0–100 (zero set potentiometer) until the voltage at this point equals the voltage present at the point where arm 28 is set on potentiometer 27. The result is zero current as both voltages are equal and no current can flow through meter 33, showing that zero reference has been established for the sweep arm 28 of potentiometer 27. Then, with 100 pounds of weight applied to the scale platform 13, the sweep arm 28 will move a certain distance relative to the resistance 27. This does not have to be a precise amount of travel in relation to a predetermined total distance, but at this point the calibration potentiometer 39' is set for exactly full scale or 100 pounds needle deflection of the meter by appropriate adjustment of contact arm 40', similarly as in the description of FIG. 12. The result is that sweep arm 28 has now moved from a zero voltage condition to a higher voltage of approximately two volts, the exact voltage being immaterial, and calibration potentiometer 39' has been set so the resultant current flow through the meter 33, due to difference in potential between the arm 38' of potentiometer 37' and arm 28 of potentiometer 27, so that there is exactly 500 micro-amperes of current flow through meter 33. With 100 pounds of weight on the scale, the selector switch 18 is set on the first contact as shown in FIG. 2, namely, for the 0 to 100 pounds range. Next, with 100 pounds weight still on the scale, selector switch 18 is shifted to the second position 100–200 pounds for zero setting of potentiometer 37a by adjusting contact arm 38a to the point where exact zero reading is shown on meter 33, when, of course, the arm 38a of potentiometer 37a and arm 28 of potentiometer 27 are at exactly the same voltage potential, so there can be no resultant current flow through meter 33 and calibration potentiometer 39a, thus establishing the zero reading for the 100–200 pound range. Then, the second 100 pounds of weight is applied to the scale for a total of 200 pounds and the contact arm 40a of potentiometer 39a is adjusted to show exactly 100 pounds reading on meter 33, wherein again there is exactly 500 microamperes of current flow through the meter determined by the setting of the calibration potentiometer 39a. The sweep arm 28 is now at approximately 4 volts while the contact arm 38a of potentiometer 37a is at approximately 2 volts. However, again, the exact amount of distance sweep arm 28 has moved and the exact voltages are immaterial. With 200 pounds of weight still resting on the scale, the selector switch 18 is now moved to the third contact for the 200–300 pound range and the same procedure is followed here in establishing by adjustment of contact arm 38b with respect to potentiometer 37b the zero setting for the 200–300 pound range, after which a third 100 pounds is placed on the scale for a total of 300 pounds and the calibration potentiometer 39b has its contact arm 40b adjusted to the point where the reading on meter 33 is exactly 100 pounds which means that there is exactly 500 micro-amperes current flow through the meter 33, as in the previous two settings for the zero to 100 pound range and the 100–200 pound range. Sweep arm 28 is now at approximately 6 volts and the contact arm 38b of potentiometer 37b is at approximately 4 volts, but here again the exact distance moved by sweep arm 28 and the exact voltages are immaterial. Two cushion diodes 41 are connected across the meter 33, as shown, to prevent overloading of meter movement. For example, should the selector switch 18 be set in the first 0–100 pound position and weight in excess of this be applied to the scale, the forward conduction diode will conduct the excess current flow that would otherwise exceed the safe limit of the meter. On the other hand, if the scale is fully loaded and weight is suddenly removed, the reverse conduction diode acts as the safety valve in that situation. The same is true if the selector switch 18 happens to be set in a higher range than is required for the weight being measured. Finally, there remains only the matter of correctly marking the graduations 21 from 0–100 for the readout instrument 16. The platform potentiometer resistance 27 is less than a thousand ohms. The zero set potentiometers 37', 37a and 37b total resistance do not exceed a thousand ohms, and less than one-third of the total resistance of potentiometer 27 is normally used for any one measurement. The meter 33 and its calibration potentiometers 39', 39a and 39b being normally approximately 4,000 ohms, errors caused by shunt currents are obviously extremely small and largely compensated by equalizing current on the opposite side of the circuit providing corrective voltage adjustment, and, as a result, we have obtained an electrical measuring current that is almost entirely self-compensating for extreme accuracy and good linearity, resulting in a readout means of exceptional accuracy.

The present invention, in either form, is applicable to any bathroom scale having a rack 30 or its equivalent that is movable lineally in direct proportion to the extent of stretch of the weighing spring 31, or its equivalent, so that the pinion 29 or its equivalent that is operated by the rack 30 will give a proportionate amount of movement to the sweep arm 28 or 28' as the case may be lineally or angularly with respect to the potentiometer 27 or 27' as the case may be.

Figure 4:
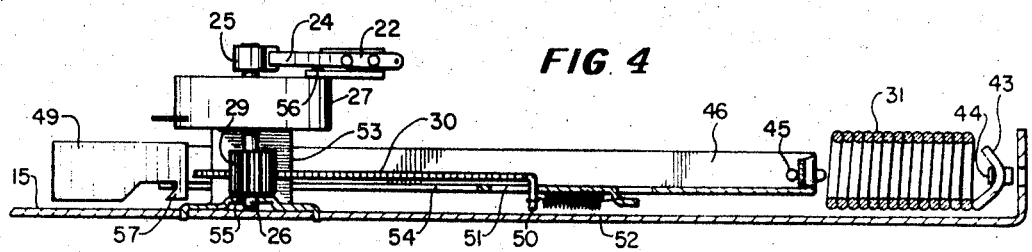
FIGS. 4 and 5 are sections on the correspondingly numbered lines of FIG. 3.
Figure 7:
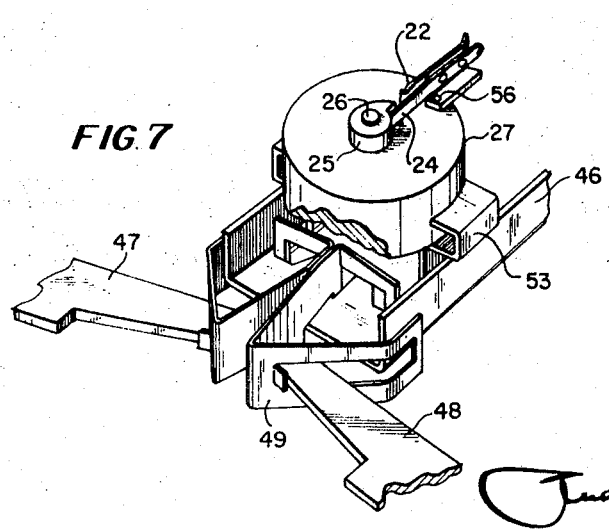
FIG. 7 is a perspective view of the central portion of FIG. 3 on a correspondingly enlarged scale.

In the present case the bathroom scale illustrated is closely similar in construction to that forming the subject matter of Provi et al. Ser. No. 641,096, filed Apr. 28, 1967, except, of course, that the scale herein shown is devoid of any window opening in the platform 23, and also that the scale shown in FIG. 1 has a carrying handle 42 provided on the front portion of the platform, and excepting further that in this case the weighing spring 31 has that end that is normally adjustably connected to a nut by a manually adjustable screw for return of the scale to zero has a hook 43 non-adjustably connected to an eye 44 struck from the side wall of the base 15 as seen in FIGS. 3 and 4, there being no need for the calibrating adjustment of the nut with respect to the attached end of the weighing spring, as commonly provided in conventional scales with mechanically operated readout means. The other end 45 of the weighing spring is hooked in the conventional manner to one end of an elongated horizontal plate 46, the other end of which has the inner ends of two motion multiplication levers 47 and 48 connected therewith through a generally T-shaped intermediate unit or member 49 so as to stretch the weighing spring 31 in a weighing operation and simultaneously give lineal movement to the rack 30, which is connected with the plate 46 by means of a downwardly projecting lug 50 entered in an elongated longitudinally extending slot 51 provided in the plate. The slot allows lost-motion so that if the scale is used roughly, the coiled tension spring 52, which resiliently connects the lug 50 to the plate 46 will prevent any damage to the scale mechanism. The potentiometer 27 has a generally U-shaped bracket 53 mounting the same on the base 15, and this bracket extends through a wide slot 54 provided in the plate 46, allowing freedom of movement of plate 46 relative to the bracket with the rack 30 in each weighing operation. The cross-portion of the bracket 53 has an embossed portion 55 providing a bearing opening therein for the lower end portion of the shaft 26, the latter resting on the base 15 as seen in FIG. 4. The body of the potentiometer 27 provides bearing support for the upper end of the shaft and also has the switch 22 fixed thereon as indicated at 56 in FIG. 7. The T-shaped unit or member 49 mentioned before hooks into the front end of the wide slot 54 previously mentioned, as best shown at 57 in FIG. 4, to transmit forward pull to the plate 46 when the motion multiplication levers 47 and 48 swing forwardly in a weighing operation.

Figure 5:
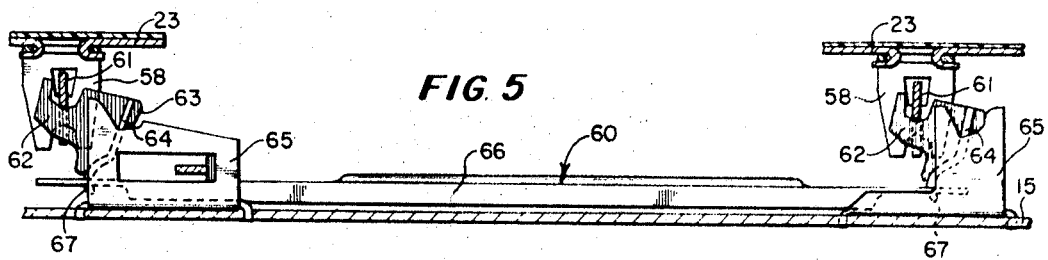
Figure 6:
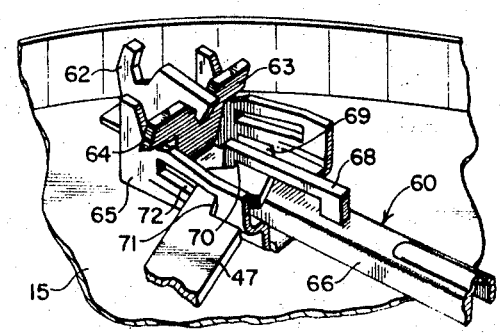
FIG. 6 is a perspective view of a portion of FIG. 3 on a larger scale to better illustrate the construction and mode of operation.
Figure 8:
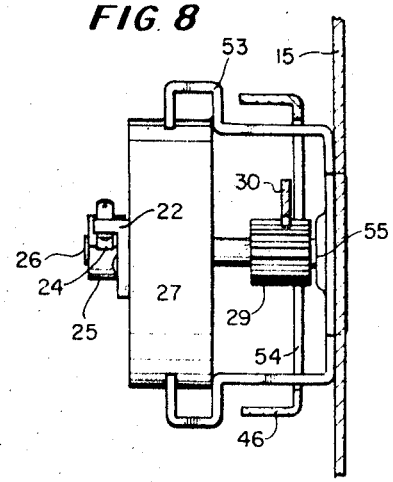
FIG. 8 is an enlarged sectional detail on the line 8—8 of FIG. 3.

Load on the platform 23 as shown in FIGS. 3 and 5, is transmitted through U-shaped brackets 58 to the opposite ends of two side lever assemblies 59 and 60 by means of hangers 61 that are of inverted U-shape and straddle the legs 62 of generally T-shaped levers 63, the cross-portions 64 of which are fulcrummed in the opposite sides of generally U-shaped brackets suitably secured to the base 15 and having bars 66 reciprocable longitudinally with respect thereto as thrust is transmitted to these bars from the T-shaped bracket 63 by their lower end portions 67, this thrust being then transferred through yokes 68 that are provided on one end of each of the bars 66 through the outer end 69 of the motion multiplication levers 47 and 48 that are fulcrummed in these yokes as shown at 70, the levers 47 and 48 being fulcrummed near their outer ends as shown at 71 in slots 72 provided in the inner side walls of the brackets 65. Thus, with very small vertical movement of the platform 23 in a weighing operation, the bell-crank levers 63 transfer the thrust to the two parallel bars 66 and they in turn transfer the thrust to the two motion multiplication levers 47 and 48 which give the desired amount of movement to the plate 46 and rack 30 as the weighing spring 31 is stretched in counteracting and assuming the load on the platform, all as more fully described and claimed in the aforementioned Provi et al. application.

The operation of the invention is believed to be clear from the foregoing. In both forms, the low voltage battery used completely eliminates fear of shock or injury in the use of the scale, even if one stood on the scale platform with wet or moist feet or if the platform happened to be wet at the time. The readout instrument, which is in more or less remote relationship to the scale, and is either mounted conveniently on a wall or adapted to be held in one's hand, could conceivably be located in another room, as, for example, in the doctor's office in which case an electric buzzer signal and/or an electric light connected in the circuit and illuminating the meter face for easier reading would call attention to the meter to insure the reading being taken before the patient steps off the scale. The adjustment of the knob 17 for selection of the correct weight range is so simple an operation as to raise no likelihood of sales resistance, because if one failed to set the knob correctly no damage to the scale or meter could result.

It is believed the foregoing description conveys a good understanding of the objects and advantages of our invention.

We claim:

1. A device of the class described comprising, in combination, a domestic type platform scale having a base adapted to rest on a support, a weight readout electrical meter in more or less remote relationship to said scale, a low voltage battery serving as an electrical current source, platform counter-balancing spring means, and a potentiometer in said scale base, electrically connected in series with said battery and in parallel with calibration resistance means, said potentiometer having a sweep arm mechanically connected with said scale platform to move relative to said potentiometer in direct proportion to the depression of said scale platform and the deflection of said counterbalancing spring means, said weight readout meter being electrically connected on the one hand with said sweep arm for variable connection with said potentiometer varied according to the weight applied to the scale platform and having an adjustably fixed connection on the other hand with said calibration resistance means.

2. A device as set forth in claim 1 including a switch in said scale that is normally in open circuit position but mechanically connected with said scale platform to be closed in the initial depression of said platform and remain closed throughout a weighing operation to complete the circuit for said battery with the rest of the circuit.

3. A device as set forth in claim 1 wherein said calibration resistance means comprises at least two potentiometers with means in each for varying the resistance used, one for zero calibration of said meter and the other for full load calibration.

4. A device as set forth in claim 1 wherein said calibration resistance means comprises at least two potentiometers with means in each for varying the resistance used, one for zero calibration of said meter and the other for full load calibration, and a cushion diode connected in parallel with said potentiometer and meter.

5. A device as set forth in claim 1 wherein said calibration resistance means comprises at least two potentiometers with means in each for varying the resistance used, one for zero calibration of said meter and the other for full load calibration, and a cushion diode connected in parallel with said meter.

6. A device as set forth in claim 1 wherein said calibration resistance means comprises at least two potentiometers with means in each for varying the resistance used, one for zero calibration of said meter and the other for full load calibration, and two cushion diodes of opposite cushioning effect connected in parallel with said meter.

7. A device as set forth in claim 1 wherein said calibration resistance means comprises a plurality of pairs of potentiometers with means in each for varying the resistance used, one for zero calibration of the meter and the other for full load calibration, each pair being for a different weight range and being selectively connectable with said meter in counter-balancing relation to the first mentioned potentiometer.

8. A device as set forth in claim 1 wherein said calibration resistance means comprises a plurality of pairs of potentiometers with means in each for varying the resistance used, one for zero calibration of the meter and the other for full load calibration, each pair being for a different weight range and being selectively connectable with said meter in counter-balancing relation to the first mentioned potentiometer, and a manually operable selector switch for selectively connecting any one of said pairs of potentiometers in circuit.

9. A device as set forth in claim 1 wherein said calibration resistance means comprises a plurality of pairs of potentiometers with means in each for varying the resistance used, one for zero calibration of the meter and the other for full load calibration, each pair being for a different weight range and being selectively connectable with said meter in counterbalancing relation to the first mentioned potentiometer and a cushion diode connected in parallel with said meter.

10. A device as set forth in claim 1 wherein said calibration resistance means comprises a plurality of pairs of potentiometers with means in each for varying the resistance used, one for zero calibration of the meter and the other for full load calibration, each pair being for a different weight range and being selectively connectable with said meter in counterbalancing relation to the first mentioned potentiometer and two cushion diodes of opposite cushioning effect connected in parallel with said meter.

11. A device of the class described comprising, in combination, a domestic type platform scale having a base adapted to rest on a support, an electrical weight readout meter, a source of electric current supply, platform counterbalancing spring means, a switch in said scale that is normally in open circuit position but is mechanically connected with said scale platform to be closed in the initial depression of said platform and remain closed throughout a weighing operation to complete a circuit including said readout meter and said source of current supply, and means operable by and in proportion to the depression of said platform and coinciding deflection of said counterbalancing spring means for varying the current flow through said meter, whereby the latter, which is graduated in pounds, gives a direct reading in pounds for the load imposed on the platform.

12. A device as set forth in claim 11 wherein the last mentioned means comprises a potentiometer in said scale base electrically connected in series with said source of current supply and in parallel with calibration resistance means, said potentiometer having a sweep arm mechanically connected with said scale platform to move relative to said potentiometer in direct proportion to the depression of said scale platform and the deflection of said counterbalancing spring means, said meter being electrically connected on the one hand with said sweep arm for variable connection with said potentiometer varied according to the load imposed on the platform and having an adjustably fixed connection on the other hand with said calibration resistance means.

13. A device as set forth in claim 12 wherein said calibration resistance means comprises at least two potentiometers with means in each for varying the resistance used, one for zero calibration of said meter and the other for full load calibration.

14. A device as set forth in claim 12 wherein said calibration resistance means comprises at least two potentiometers with means in each for varying the resistance used, one for zero calibration of said meter and the other for full load calibration, and a cushion diode connected in parallel with said potentiometer and meter.

15. A device as set forth in claim 12 wherein said calibration resistance means comprises at least two potentiometers with means in each for varying the resistance used, one for zero calibration of said meter and the other for full load calibration, and a cushion diode connected in parallel with said meter.

16. A device as set forth in claim 12 wherein said calibration resistance means comprises at least two potentiometers with means in each for varying the resistance used one for zero calibration of said meter and the other for full load calibration, and two cushion diodes of opposite cushioning effect connected in parallel with said meter.

17. A device as set forth in claim 12 wherein said calibration resistance means comprises a plurality of pairs of potentiometers with means in each for varying the resistance used, one for zero calibration of the meter and the other for full load calibration, each pair being for a different weight range and being selectively connectable with said meter in counterbalancing relation to the first mentioned potentiometer.

18. A device as set forth in claim 12 wherein said calibration resistance means comprises a plurality of pairs of potentiometers with means in each for varying the resistance used, one for zero calibration of the meter and the other for full load calibration, each pair being for a different weight range and being selectively connectable with said meter in counterbalancing relation to the first mentioned potentiometer, and a manually operable selector switch for selectively connecting any one of said pairs of potentiometers in circuit.

19. A device as set forth in claim 12 wherein said calibration resistance means comprises a plurality of pairs of potentiometers with means in each for varying the resistance used, one for zero calibration of the meter and the other for full load calibration, each pair being for a different weight range and being selectively connectable with said meter in counter balancing relation to the first mentioned potentiometer and a cushion diode connected in parallel with said meter.

20. A device as set forth in claim 12 wherein said calibration resistance means comprises a plurality of pairs of potentiometers with means in each for varying the resistance used, one for zero calibration of the meter and the other for full load calibration, each pair being for a different weight range and being selectively connectable with said meter in counterbalancing relation to the first mentioned potentiometer and two cushion diodes of opposite cushioning effect connected in parallel with said meter.

References Cited

UNITED STATES PATENTS

| | | | |
|---|---|---|---|
| 1,407,078 | 2/1922 | Murray | 177—211 XR |
| 2,108,575 | 2/1938 | Benedict | 177—210 XR |
| 2,141,236 | 12/1938 | Benedict | 177—210 XR |
| 2,786,669 | 3/1957 | Safford et al. | 177—164 XR |
| 2,805,055 | 9/1957 | Swanson | 177—211 |
| 3,241,626 | 3/1966 | Woodburn | 117—211 XR |

FOREIGN PATENTS 590,564 1/1960 Canada.
956,205 1/1957 Germany.

ROBERT S. WARD, Jr., Primary Examiner

U.S. Cl. X.R.
177—126, 164